(12) United States Patent
Yee

(10) Patent No.: US 9,679,400 B2
(45) Date of Patent: *Jun. 13, 2017

(54) PICTORAL METHODS FOR APPLICATION SELECTION AND ACTIVATION

(71) Applicant: QUALCOMM Incorporated, San Diego, CA (US)

(72) Inventor: Mong Suan Yee, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,696

(22) Filed: Sep. 30, 2016

(65) Prior Publication Data

US 2017/0018100 A1    Jan. 19, 2017

Related U.S. Application Data

(63) Continuation of application No. 12/276,959, filed on Nov. 24, 2008, now Pat. No. 9,501,694.

(51) Int. Cl.
*G06F 3/041* (2006.01)
*G06T 11/20* (2006.01)
(Continued)

(52) U.S. Cl.
CPC .......... *G06T 11/20* (2013.01); *G06F 3/03547* (2013.01); *G06F 3/0412* (2013.01); *G06F 3/04883* (2013.01); *G06K 9/00422* (2013.01)

(58) Field of Classification Search
USPC .......... 345/173, 174, 179, 473, 474; 341/28; 178/18.03
See application file for complete search history.

(56) References Cited

U.S. PATENT DOCUMENTS 5,687,254 A   11/1997   Poon et al.
5,917,942 A    6/1999   Ehsani et al.
(Continued)

FOREIGN PATENT DOCUMENTS

EP   1331546 A2   7/2003
EP   1462921 A2   9/2004
(Continued)

OTHER PUBLICATIONS

Gul-e-Saman et al., "Visual Sign Language Interpretation Using Spatial Temporal Neural Processing", IEEE, 2006, pp. 128-133.*

(Continued)

*Primary Examiner* — Thuy Pardo
(74) *Attorney, Agent, or Firm* — Shirin Tefagh

(57) ABSTRACT

Methods and devices provide a quick and intuitive method to launch a specific application, dial a number or send a message by drawing a pictorial key, symbol or shape on a computing device touchscreen, touchpad or other touchsurface. A shape drawn on a touchsurface is compared to one or more code shapes stored in memory to determine if there is a match or correlation. If the entered shape correlates to a stored code shape, an application, file, function or keystroke sequence linked to the correlated code shape is implemented. The methods also enable communication involving sending a shape or parameters defining a shape from one computing device to another where the shape is compared to code shapes in memory of the receiving computing device. If the received shape correlates to a stored code shape, an application, file, function or keystroke sequence linked to the correlated code shape is implemented.

28 Claims, 14 Drawing Sheets

(51) Int. Cl.
  *G06F 3/0488* (2013.01)
  *G06K 9/00* (2006.01)
  *G06F 3/0354* (2013.01)

(56) References Cited

U.S. PATENT DOCUMENTS

| | | | |
|---|---|---|---|
| 6,054,999 A * | 4/2000 | Strandberg | G06T 13/80 345/474 |
| 6,275,611 B1 | 8/2001 | Parthasarathy | |
| 6,694,045 B2 * | 2/2004 | Chung | G06K 7/10346 345/179 |
| 6,795,579 B2 * | 9/2004 | Tang | G06K 9/00429 341/28 |
| 7,054,510 B1 | 5/2006 | Milner | |
| 7,298,904 B2 | 11/2007 | Chen et al. | |
| 7,802,056 B2 | 9/2010 | Demsey et al. | |
| 7,903,905 B2 | 3/2011 | Lapstun et al. | |
| 7,965,293 B2 | 6/2011 | Fujiwara et al. | |
| 8,526,767 B2 | 9/2013 | Bowens | |
| 8,553,037 B2 * | 10/2013 | Smith | G06T 13/40 345/473 |
| 2006/0001656 A1 | 1/2006 | LaViola, Jr. et al. | |
| 2007/0082710 A1 | 4/2007 | Jang | |
| 2007/0083325 A1 | 4/2007 | Baba et al. | |
| 2009/0059318 A1 | 3/2009 | Lapstun et al. | |
| 2009/0090567 A1 * | 4/2009 | Tonouchi | G06F 3/017 178/18.03 |
| 2009/0222770 A1 | 9/2009 | Chang | |
| 2009/0273571 A1 | 11/2009 | Bowens | |
| 2010/0007665 A1 * | 1/2010 | Smith | G06T 13/40 345/473 |
| 2010/0045627 A1 * | 2/2010 | Kennedy | G06F 3/0416 345/173 |
| 2010/0090815 A1 | 4/2010 | Yamaya | |
| 2010/0127991 A1 | 5/2010 | Yee | |
| 2011/0129168 A1 | 6/2011 | Lapstun et al. | |

FOREIGN PATENT DOCUMENTS

| | | |
|---|---|---|
| JP | 2006215762 A | 8/2006 |
| JP | 2007531113 A | 11/2007 |
| JP | 2008046692 A | 2/2008 |
| JP | 2008226048 A | 9/2008 |
| KR | 20070038643 A | 4/2007 |
| WO | WO-9819292 | 5/1998 |
| WO | WO-2005103863 A2 | 11/2005 |
| WO | WO-2008000435 A1 | 1/2008 |
| WO | WO-2008078523 A1 | 7/2008 |

OTHER PUBLICATIONS

Patrick Bosinco et al., Touch & Design (T' ND), IEEE, 2006, pp. 1-7.*

Dr. Suneeta Agarwal and Vikas Kumar, "Online Character Recognition," Proceedings of the Third International Conference on Information Technology and Applications (ICITA) 2005.

International Search Report & Written Opinion—PCT/US2009/061781, International Search Authority—European Patent Office—Apr. 6, 2010.

Invitation to Pay Additional Fees—PCT/US2009/061781, International Search Authority—European Patent Office—Jan. 22, 2010.

Li C. L., et al., "A Template-matching Approach to Free-form Feature Recognition," Information Visualization, 2000, Proceedings, IEEE Inte.

Moises Pastor, Alejandro Toselli and Enrique Vidal, "Writing Speed Normalization for On-Line Handwritten Text Recognition," Proceedings of the 2005 Eight International Conference on Document Analysis and Recognition (ICDAR) 2005.

* cited by examiner

| | Time (10 ms) | X-Axis Position | y-Axis Position | Speed (nm/s) |
|---|---|---|---|---|
| 70a | 1 | | | 0 |
| 70b | 2 | | | 0 |
| 70c | 3 | 3 | 17 | 0 mm/s |
| 70d | 4 | | | 0 |
| 70e | 5 | | | 0 |
| 70f | 6 | 6 | 15 | 20 mm/s |
| 70g | 7 | 7 | 15 | 19 mm/s |
| 70h | 8 | 8 | 14 | 18 mm/s |
| 70i | 9 | 9 | 13 | 17 mm/s |
| 70j | 10 | 10 | 12 | 16 mm/s |
| 70k | 11 | 11 | 11 | 15 mm/s |
| 70m | 12 | 12 | 10 | 14 mm/s |
| 70n | 13 | 13 | 9 | 13 mm/s |
| 70p | 14 | 14 | 8 | 12 mm/s |
| 70q | 15 | 15 | 7 | 11 mm/s |
| 70r | 16 | 16 | 7 | 10 mm/s |
| 70s | 17 | | | 0 |
| 70t | 18 | 18 | 5 | 0 mm/s |
| 70u | 19 | | | 0 |
| 70v | 20 | 20 | 3 | 0 nm/s |

Fig. 8

| Index (82) | Shape parameters (84) | Type of Link (86) | Application, File or Keystrokes (88) |
|---|---|---|---|
| 1 | X—X+20:Y; X+10:Y+10—Y-10 | App | Calculator |
| 2 | X1—X1+20:Y1—Y1-20 | Text | Hi there |
| 3 | XY Table Memory Pointer 1 | File | Mom.tif |
| 4 | Vector Parameter File Pointer 2 | Key | 8185551212Snd |

Rows labeled 80a, 80b, 80c, 80d.

FIG. 9

Table 90:

| Index (92) | Shape parameters (94) |
|---|---|
| 1 | X1—X1+20:Y1; X2:Y2—Y2-20 |
| 2 | X1—X1+20:Y1—Y1-20 |
| 3 | XY Table Memory Pointer 1 |
| 4 | Parameter File Pointer 2 |

Rows labeled 93a, 93b, 93c, 93d.

Table 91:

| Index (92) | Type of Link (95) | Application, File or Keystrokes (96) |
|---|---|---|
| 1 | App | Calculator |
| 2 | Text | Hi there |
| 3 | File | Mom.tif |
| 4 | Key | 8185551212Snd |

Rows labeled 97a, 97b, 97c, 97d.

FIG. 10

PICTORAL METHODS FOR APPLICATION SELECTION AND ACTIVATION

This application is a continuation of U.S. patent application Ser. No. 12/276,959 entitled "Pictorial Methods For Application Selection and Activation" filed Nov. 24, 2008, the entire contents of which are incorporated herein by reference.

FIELD OF THE INVENTION

The present invention relates generally to computer user interface systems and more particularly to user defined shapes for selecting and implementing desired actions on a computing device.

BACKGROUND

Personal electronic devices (e.g. cell phones, PDAs, laptops, gaming devices) provide users with increasing functionality and data storage. Thousands of applications are now available for personal electronic devices and a typical device may include dozens. Applications may be presented in menus, such as in the form of icons that appear on a touchscreen display. Locating a desired application can be laborious and positioning icons on the desktop display for easy access can clutter the display and may not be practical in small devices, such as cellular telephone.

SUMMARY

Various aspects provide methods and systems for enabling users to access an application or implement functions by drawing a figure using a graphical user interface such as a touchscreen display. In one aspect, a method for initiating an action on a computing device, includes receiving a shape drawn on a touchsurface, comparing the received shape to a code shape stored in memory, and implementing an action linked to the stored code shape if the received shape correlates to the code shape. The method may include processing the shape as a touchsurface user interface command if the received shape does not correlate to the code shape. The method may also include receiving a shape drawn on the touchsurface; storing the received shape in memory as the code shape; and linking an action to the stored code shape. The shape may be processed to determine parameters defining the received shape and storing the shape defining parameters in memory as the code shape. The method may also include receiving a shape drawn on the touchsurface a plurality of times, determining parameters defining a nominal shape representative of the plurality of received shapes, determining a variability of the plurality of received shapes about the nominal shape, and storing the nominal shape defining parameters and the determined variability in memory as the code shape, wherein comparing the received shape to a code shape stored in memory comprises determining whether the received shape correlates to the nominal shape within the determined variability. The method may also include receiving a sequence of keystrokes or receiving identification of an application, wherein linking an action to the stored code shape comprises storing the received sequence of keystrokes or the application in memory correlated to the code.

In another aspect, a method of communicating includes receiving in a first computing device a message from a second computing device including shape parameters of a shape drawing on a touchscreen of the second computing device, comparing the received shape parameters to shape parameters of a code shape stored in memory, and implementing an action linked to the stored code shape if the received shape correlates to the code shape.

In another aspect, a computing device is presented that includes a processor, a touchsurface coupled to the process, and a memory coupled to the processor, wherein the processor is configured to receive a shape drawn on the touchsurface, compare the received shape to a code shape stored in the memory, and implement an action linked to the stored code shape if the received shape correlates to the code shape. The processor of the computing device may be further configured to processes the shape as a touchsurface user interface command if the received shape does not correlate to the code shape. The processor of the computing device may be further configured to receive a shape drawn on the touchsurface, store the received shape in memory as the code shape, and link an action to the stored code shape. The processor of the computing device may be further configured to determining parameters defining the received shape and store the shape defining parameters in memory as the code shape. The processor of the computing device may be further configured to receive a shape drawn on the touchsurface a plurality of times, determine parameters defining a nominal shape representative of the plurality of received shapes, determine a variability of the plurality of received shapes about the nominal shape, store the nominal shape defining parameters and the determined variability in memory as the code shape, and link an action to the stored code shape, wherein comparing the received shape to a code shape stored in memory comprises determining whether the received shape correlates to the nominal shape within the determined variability. The processor of the computing device may be further configured to receive a sequence of keystrokes or an identification of an application, wherein linking an action to the stored code shape comprises storing the received sequence of keystrokes in memory correlated to the code shape. The touchsurface may be one of touchscreen and a touchpad.

In another aspect, a computing device includes a processor and a memory coupled to the processor, wherein the processor is configured to receive receiving a message from a second computing device including shape parameters of a shape drawing on a touchscreen of the second computing device, compare the received shape parameters to shape parameters of a code shape stored in memory, and implement an action linked to the stored code shape if the received shape correlates to the code shape.

In another aspect, a computing devices includes a means for receiving a shape drawn on a touchsurface, a means for comparing the received shape to a code shape stored in memory, and a means for implementing an action linked to the stored code shape if the received shape correlates to the code shape. The computing device may also include means for processing the shape as a touchsurface user interface command if the received shape does not correlate to the code shape, a means for receiving a shape drawn on the touchsurface, a means for storing the received shape in memory as the code shape, and a means for linking an action to the stored code shape. The computing device may also include means for receiving a shape drawn on the touchsurface, means for determining parameters defining the received shape, means for storing the shape defining parameters in memory as the code shape, and means for linking an action to the stored code shape. The computing device may also include means for receiving a shape drawn on the touchsurface a plurality of times, means for determining parameters defining a nominal shape representative of the plurality of received shapes, means for determining a variability of the plurality of received shapes about the nominal shape, means for storing the nominal shape defining parameters and the determined variability in memory as the code shape, and means for linking an action to the stored code shape, wherein the means for comparing the received shape to a code shape stored in memory includes a means for determining whether the received shape correlates to the nominal shape within the determined variability. The computing device may also include means for receiving a sequence of keystrokes, means for receiving identification of an application, wherein means for linking an action to the stored code shape comprises means for storing a link to the stored sequence of keystrokes or the identified application in memory correlated to the code shape.

In another aspect, a computing device is presented that includes a means for receiving a message from a another computing device including shape parameters of a shape drawing on a touchscreen of the other computing device, a means for comparing the received shape parameters to shape parameters of a code shape stored in memory, and a means for implementing an action linked to the stored code shape if the received shape correlates to the code shape.

In another aspect, a computer program product is presented including a computer-readable medium that includes at least one instruction for receiving a shape drawn on a touchsurface, at least one instruction for comparing the received shape to a code shape stored in memory, and at least one instruction for implementing an action linked to the stored code shape if the received shape correlates to the code shape. The computer-readable medium may also include at least one instruction for processing the shape as a touchsurface user interface command if the received shape does not correlate to the code shape. The computer-readable medium may also include at least one instruction for receiving a shape drawn on the touchsurface, at least one instruction for storing the received shape in memory as the code shape, and at least one instruction for linking an action to the stored code shape. The computer-readable medium may also include at least one instruction for receiving a shape drawn on the touchsurface, at least one instruction for determining parameters defining the received shape, at least one instruction for storing the shape defining parameters in memory as the code shape, and at least one instruction for linking an action to the stored code shape. The computer-readable medium may also include at least one instruction for receiving a shape drawn on the touchsurface a plurality of times, at least one instruction for determining parameters defining a nominal shape representative of the plurality of received shapes, at least one instruction for determining a variability of the plurality of received shapes about the nominal shape, at least one instruction for storing the nominal shape defining parameters and the determined variability in memory as the code shape, and at least one instruction for linking an action to the stored code shape, wherein the at least one instruction for comparing the received shape to a code shape stored in memory includes at least one instruction for determining whether the received shape correlates to the nominal shape within the determined variability. The computer-readable medium may also includes at least one instruction for receiving a sequence of keystrokes, wherein the at least one instruction for linking an action to the stored code shape includes at least one instruction for storing the received sequence of keystrokes in memory correlated to the code shape. The computer-readable medium may also includes at least one instruction for receiving identification of an application, wherein the linking an action to the stored code shape comprises at least one instruction for storing a link to the identified application in memory correlated to the code shape.

In another aspect, a computer program product is presented including a computer-readable medium that includes at least one instruction for receiving in a first computing device a message from a second computing device including shape parameters of a shape drawing on a touchscreen of the second computing device, at least one instruction for comparing the received shape parameters to shape parameters of a code shape stored in memory, and at least one instruction for implementing an action linked to the stored code shape if the received shape correlates to the code shape.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIG. 8 is an example data structure for storing a code shape.

FIG. 9 is an example data structure for storing a code shape and corresponding desired actions.

FIG. 10 is an alternative example data structure for storing a code shape and course bonding desired actions in to cross-correlated data tables.

DETAILED DESCRIPTION

Figure 1:
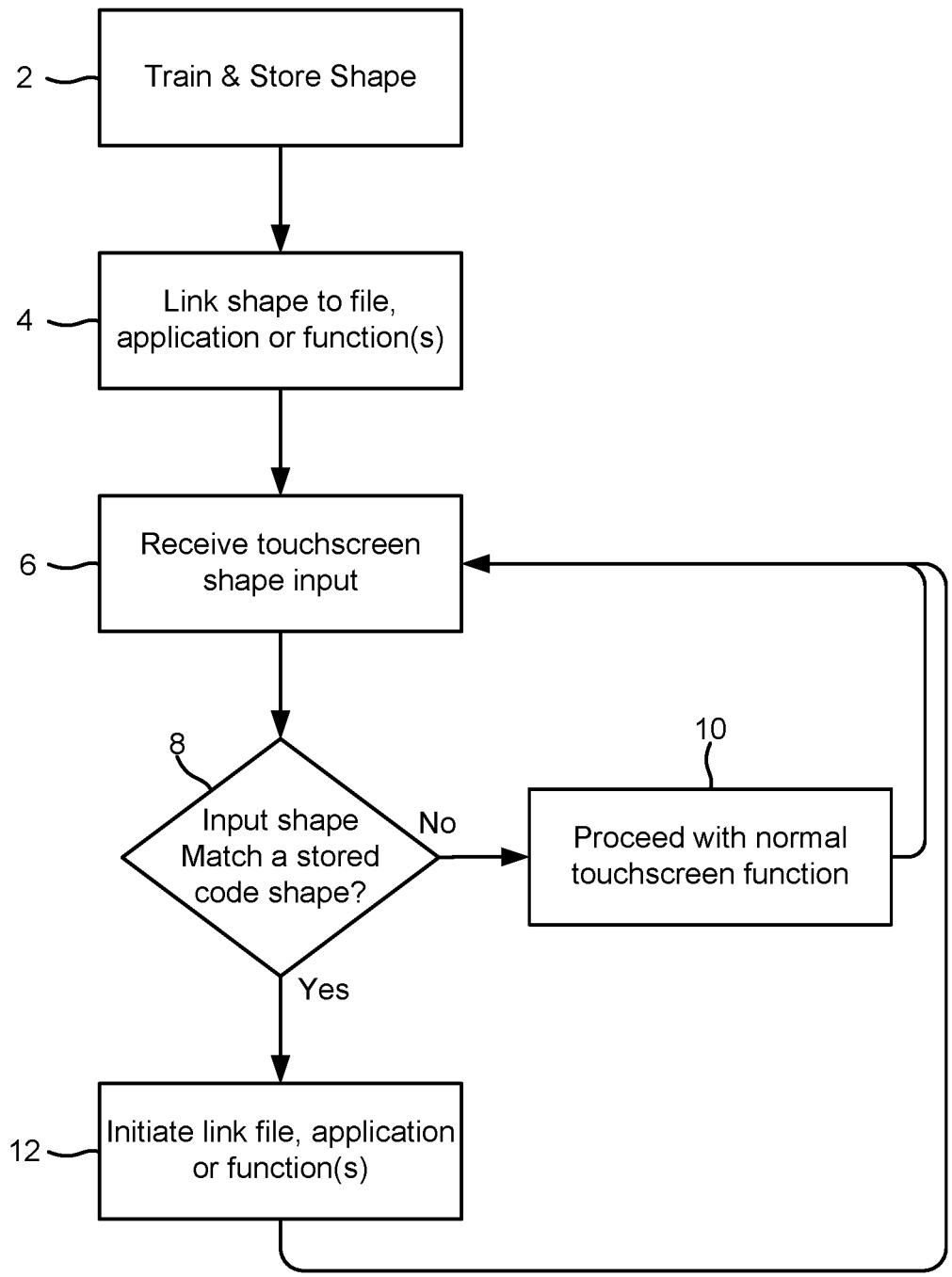
FIG. 1 is a process flow diagram illustrating an overview process of the various aspects of the present invention.

Various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, a "touchscreen" is a touch input device with an associated image display. As used herein, a "touchpad" is a touch input device without an associated image display. A touchpad, for example, can be implemented on any surface of an electronic device outside the image display area. Touchscreens and touchpads are generically referred to herein as a "touchsurface." Touchsurfaces may be integral parts of an electronic device, such as a touchscreen display, or a separate module, such as a touchpad, which can be coupled to the electronic device by a wired or wireless data link.

As used herein, the terms "electronic device" or "computing device" refer to any one or all of cellular telephones, personal data assistants (PDA's), palm-top computers, notebook computers, personal computers, wireless electronic mail receivers and cellular telephone receivers (e.g., the Blackberry® and Treo® devices), multimedia Internet enabled cellular telephones (e.g., the iPhone®), and similar electronic devices which include a programmable processor, memory and a connected or integral touchsurface. The present invention is applicable to any type of portable or non-portable electronic device having either an integral touchsurface or a touchsurface that is connectable to the electronic device, such as by a wired datalink (e.g., a USB or FireWire® data cable) or a wireless data link (e.g., a BlueTooth® data link). In a preferred aspect, the electronic device is a cellular telephone including an integral touchscreen display.

As used herein, "shape" refers to any sequence of one or more touches and/or one or more lines defined on a touchsurface (i.e., touchscreen or touchpad) by a user. In this context, a shape may be as simple as a single tap on a touchsurface or as complex as numerous touches lines and loops drawn on a touchsurface.

As used herein, "envelope" refers to an acceptable range of a shape parameter that accounts for the inherent variability in shapes drawn by a user on a touchsurface. The parameter can be, for example, relative X-axis position, relative Y-axis position, drawing speed, and line thickness (i.e. contact area), and each of these with respect to time. The parameter may be enveloped against time or against relative position on the touchsurface.

The various aspects of the present invention provide methods and systems for activating predetermined applications, files, functions or keystroke sequences by drawing a particular figure or shape on a touchsurface. For ease of reference memorized figures or shapes are linked to a desired predetermine action are referred to herein as a "code shape." A user can create a code shape by training the computing device to recognize a particular shape by drawing it on a touchsurface in a series of movements and touches within a brief period of time. The series of movements and touches are processed and stored in memory. The series of movements may be processed to reduce the shapes into shape parameters which define the shape in a reduced data set. Users may be required to draw the code shape a number of times to record variability in the shape as drawn by the user. Such variability can be used to determine statistical variability or define a boundary envelope of the shape code that can be used in recognition algorithms. The shape parameters and associated statistical variability or envelope may be stored as a shape code. Stored code shapes may be linked to a desired action, such as implementing particular applications, files, functions or keystroke sequences, with the linkage also stored in memory. This linkage may be stored within a code shape table or within a cross-correlated function table.

Once a code shape has been created and correlated to a desired action, users can activate the linked application, file, function or keystroke sequence by drawing the code shape on the touchsurface. When a shape is drawn on a touchsurface, the computing device can receive input shapes and compare them to a table of shape codes to determine if the user has entered a shape code. If there is no correlation between the shapes being entered on the touchsurface and stored code shapes, the user inputs may be received and processed as normal touchsurface user inputs. If an entered shape matches a stored code shape (e.g., within a statistical tolerance threshold), the linked application, file, function or keystroke sequence can be recalled from memory and initiated. Code shapes and linked applications, files, functions or keystroke sequences may be stored in one or more data tables which can be stored on a tangible media and/or transmitted via a communication link enabling transfer to another device. A shape can be entered on the touchsurface of a first device with the shape parameters communicated to a second computing device containing a code shape table or tables in order to cause a linked application, file, function or keystroke sequence to execute on the second computing device.

By enabling users to link functionality to a shape, the various aspects provide an efficient user interface that users can customize with their own shape creations. For many people it may be easier to remember a particular shape than a filename or series of function commands. Users can use a shape that they naturally associate with a particular function or file. For example, a user may link a code shape in the form of a plus sign ("+") drawn on a touchscreen to launch a calculator application, a code shaped in the form of a dollar sign ("$") to a personal finance application, and a capital W to an Internet browser. As these examples illustrate, a code shape can be both memorable and easy to enter into a touchscreen or touchpad to provide an efficient method for activating a linked application, file, function or keystroke sequence.

FIG. 1 is a process flow diagram illustrating an overview of the various aspects of the present invention. When a user creates a code shape, a computing device receives the shape drawn by the user on a touchsurface one or more times and stores the shape, or parameters representative of the shape, in memory, block 2. Further details regarding training and storing code shapes are provided below with reference to FIG. 3. Once a code shape is defined, it can be linked to a particular application, file, function or keystroke sequence by the user indicating the desired action(s) that should be associated with the stored code shape and the computing device storing that linkage, block 4. Further details regarding linking a code shape to a particular application, file, function or keystroke sequence are provided below with reference to FIGS. 4 and 5. Thereafter, whenever a user draws on a touchsurface, such as a touchscreen, the shape input is received, block 6, and compared to stored code shapes to determine if there is a match, decision block 8. If there is no match (i.e., decision block 8="No"), the input from the touchsurface may be processed as a normal touchsurface user input, block 10. Thus, if a user is drawing a figure or writing text, the figure or text may be processed in the ordinary matter. However, if the shape input matches a stored code shape (i.e., decision block 8="Yes"), the computing device executes or activates the link application, file, function or keystroke sequence, block 12. Further details regarding recognizing a code shape and executing a particular application, file, function or keystroke sequence are provided below with reference to FIG. 7.

Figure 2A:
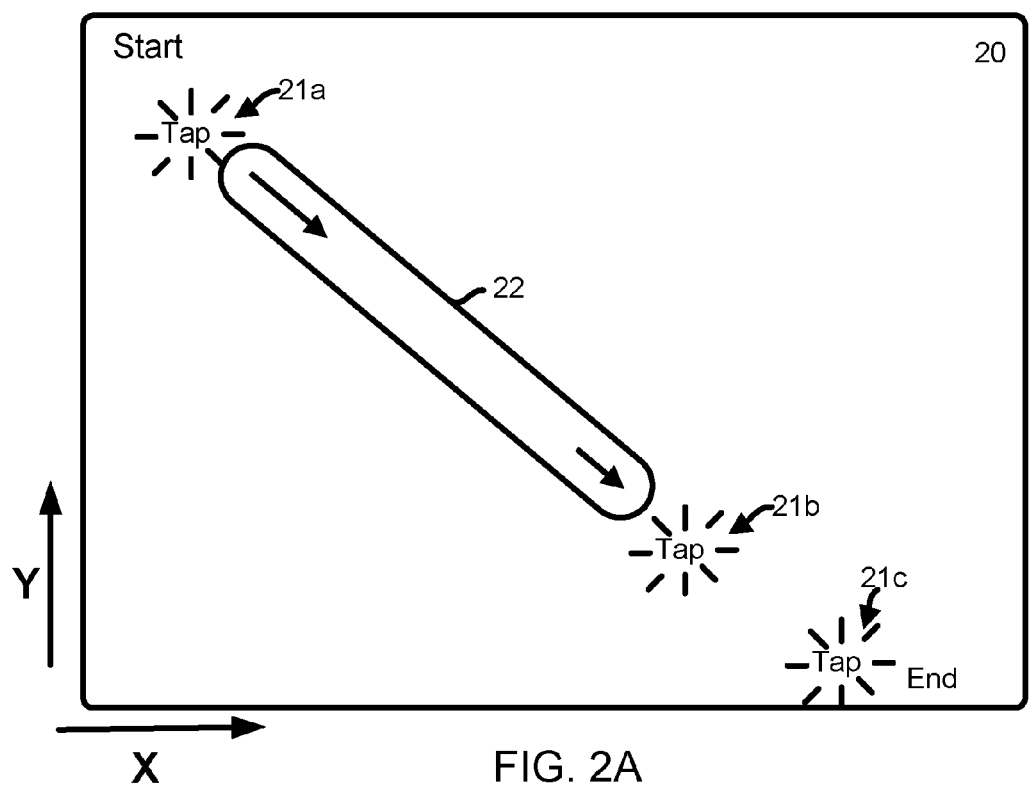
FIG. 2A-2D are illustrations of example shapes entered on a touchscreen user interface.
Figure 2B:
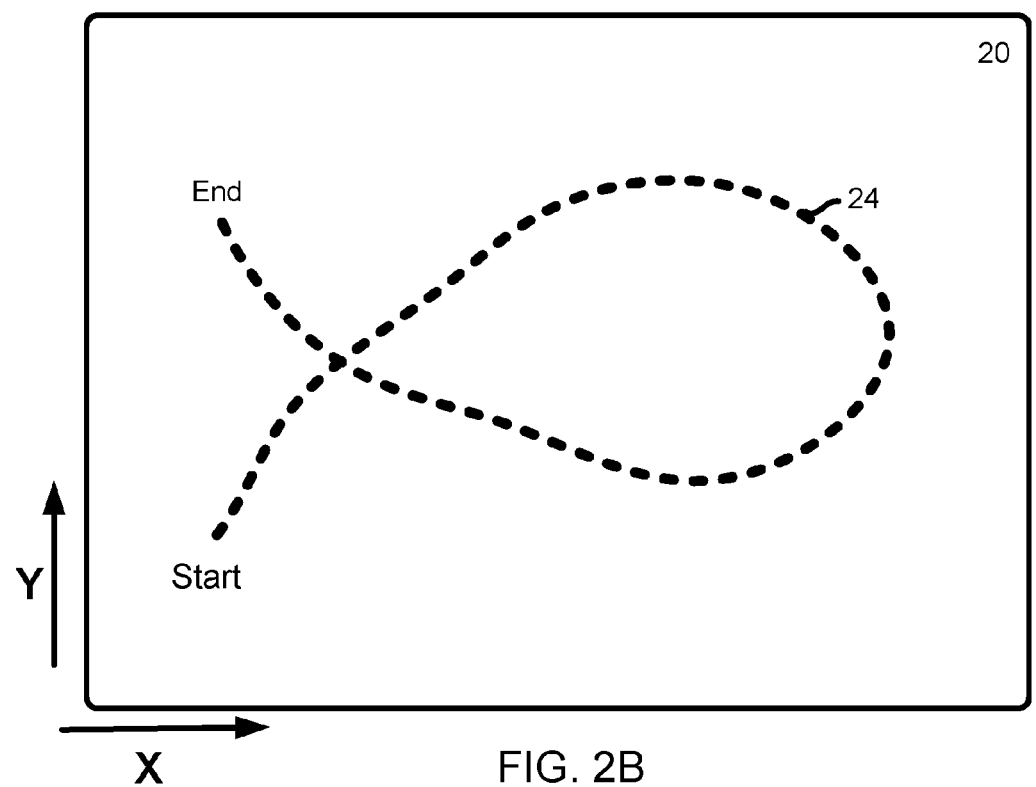
Figure 2C:
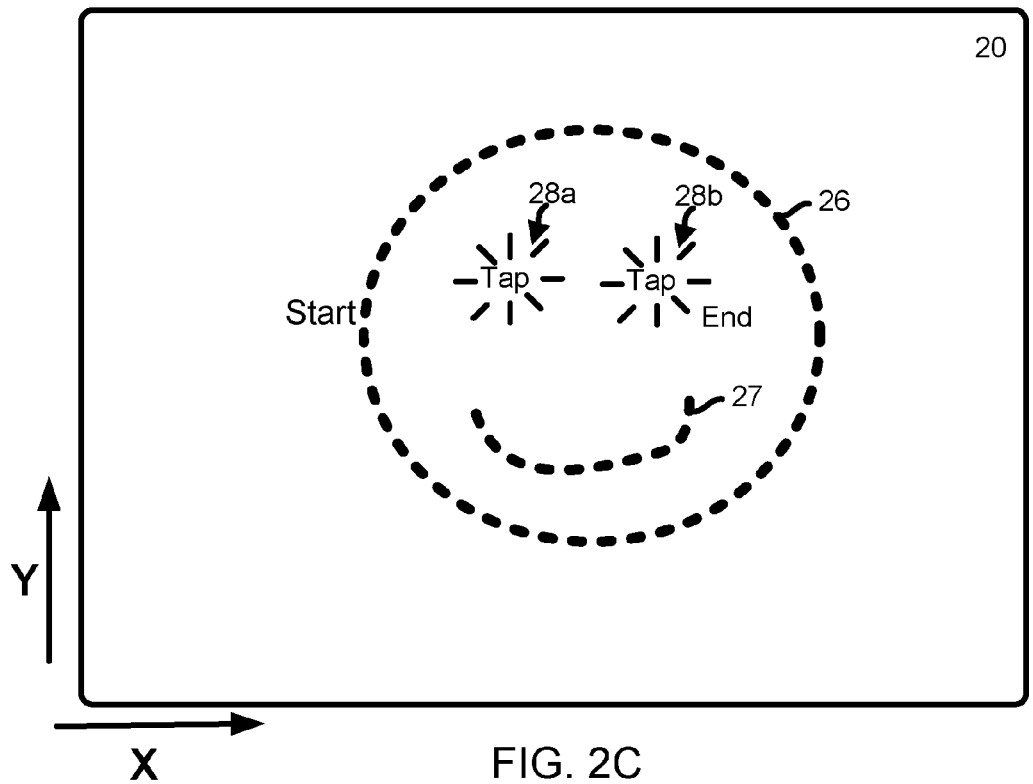

Code shapes can encompass a variety of taps, lines and loops that may be drawn on a touchsurface by a finger or stylus. For example, FIG. 2A illustrates a shape drawn on a touchscreen 20 that includes a first tap 21a in the upper left region of the touchscreen 20 followed by a line 22 drawn in a downward, left to right direction, followed by two taps 20b and 20c in the lower right region of the touchscreen 20. As another example, FIG. 2B illustrates a shape drawn on a touchscreen 20 that comprises a continuous horizontally oriented loop 24 that starts in the lower left-hand corner and ends in the upper left-hand corner. As a third example, FIG. 2C illustrates a "happy face" shape drawn on a touchscreen 20 that includes a circle 26 then encloses an arc 27 and two taps 28a and 28b, in which the shape begins with drawing of the circle and ends with the second tap 28b.

Figure 2D:
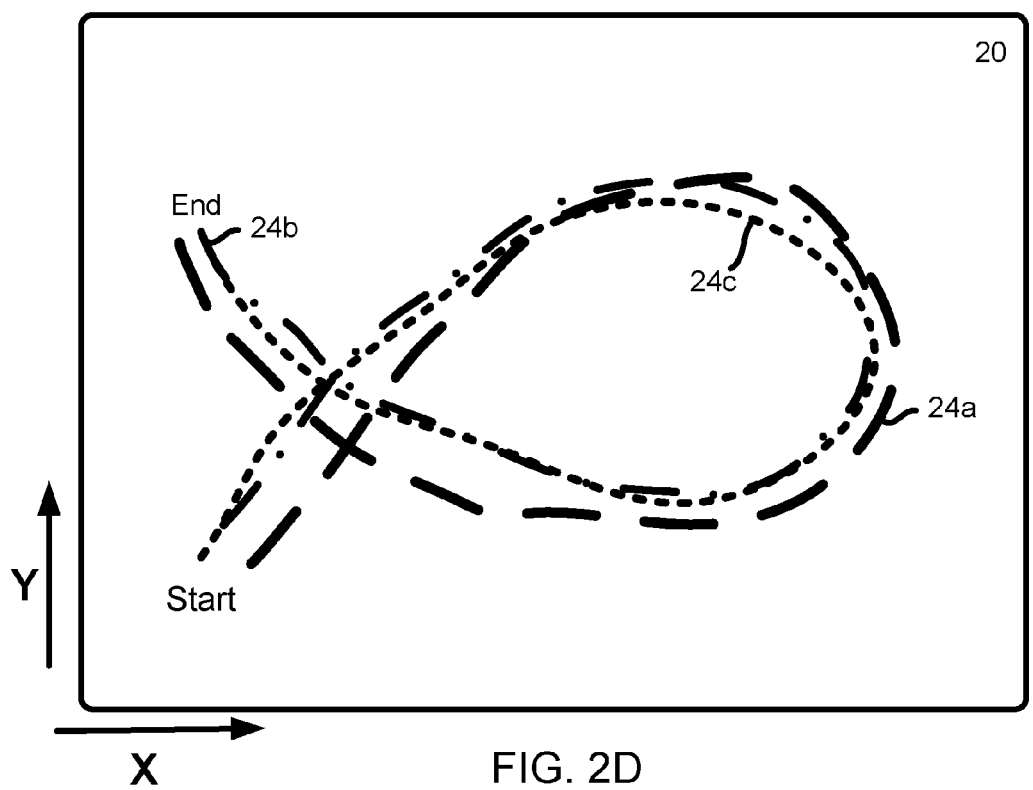

Since shapes entered into a touchsurface will inherently vary in dimensions and angles, the process of training a computing device (block 2 in FIG. 1) may involve the user entering the same shape a number of times so that the computing device can analyze such variability. This is illustrated in FIG. 2D which shows three versions of the single loop code shape 24a, 24b, 24c. As this figure illustrates, no two shapes entered into a touchscreen 20 by a user are likely to be identical in all aspects. Nevertheless, a user's code shape is likely to involve recognizable features or parameters that can be identified within such variability. By comparing a number of shape entries, a computing device can determine statistical bounds or correlation thresholds that can be used to recognize when a particular user shape entry matches a stored code shape. For example, an average shape may be computed from multiple shape entries 24a, 24b, 24c, along with an envelope (e.g., one or two standard deviations about the average shape). As another example, an average shape may be computed from multiple shape entries 24a, 24b, 24c, along with a shape correlation value which reflects the degree to which all of the multiple shape entries 24a, 24b, 24c correlate to that average shape. A variety of statistical methods may be used to account for the variability of user drawn shapes in order to enable a computing device to reliably distinguish a code shape from other shapes drawn on a touchsurface.

A code shape may be analyzed and stored using a variety of methods for characterizing a shape. For example, in a first method a code shape may be stored as a series of X and Y position values in a data table, either as a sequence of points equal distance apart or as sequence of coordinates versus time. In a second example method, a code shape may be analyzed to identify segments which can be characterized by a sequence of primitives (such as lines, curves and dots). In a third example method, a code shape may be analyzed to determine a link to a set of factors which when drawn in sequence will replicate the shape. The particular data format used to store a code shape may be selected based upon the amount of data required to characterize the shape, as well as the algorithms that are used to compare an entered shape to a stored code shape. The various aspects of the present invention are not limited to a particular data structure or shape characterization method. For ease of reference, the information characterizing a shape is referred to as the "shape parameters." Thus, the shape parameters will be the X and Y points versus distance or time in the first example method, a sequence of primitives in the second example method, and a series of vectors in the third example method.

Figure 3:
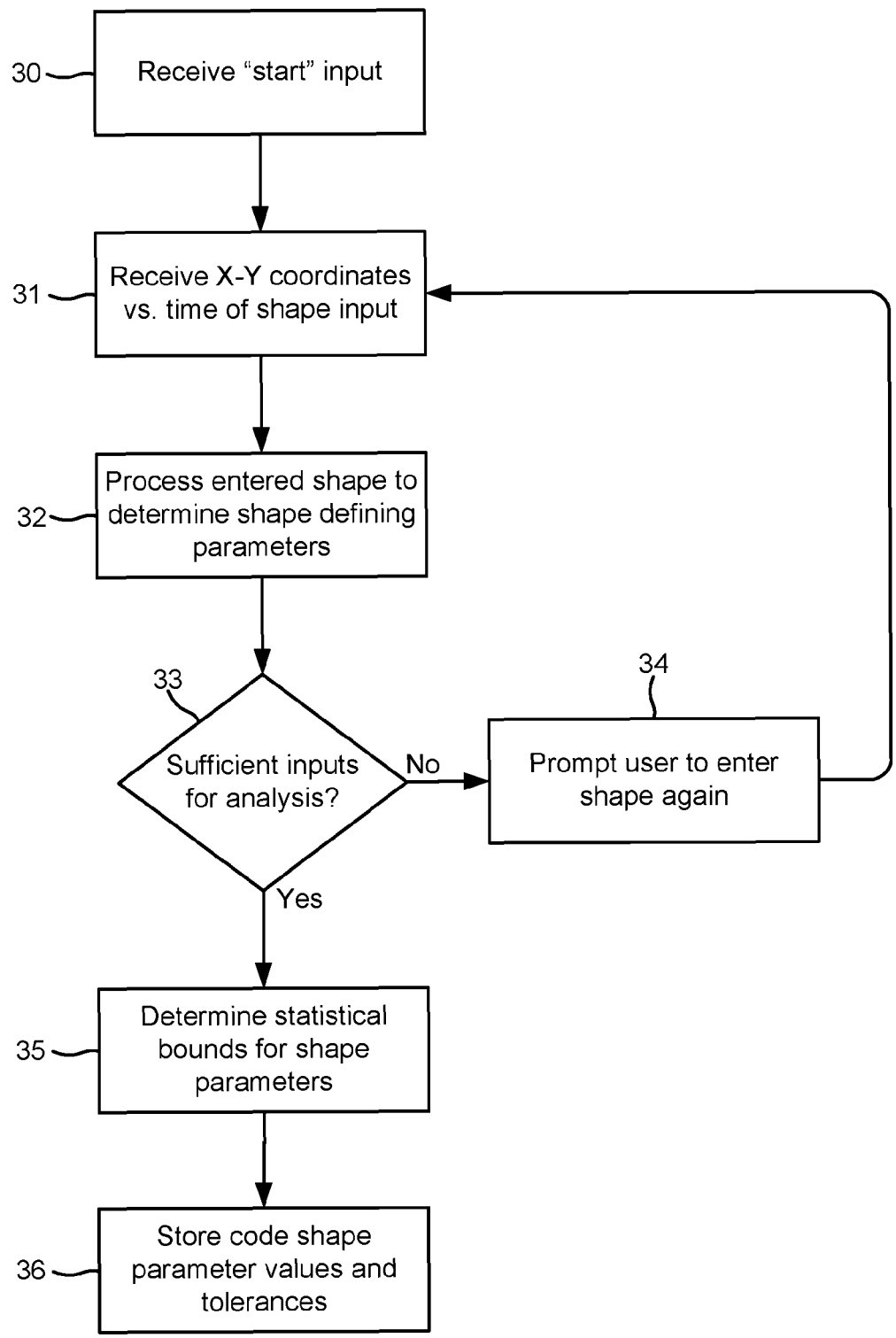
FIG. 3 is a process flow diagram of a method for generating a code shape.

FIG. 3 illustrates a method for training a computing device to recognize a particular code shape. To begin the training process, a user may select a menu function or press a key to inform the computing device that a shape is about to be entered for training purposes, block 30. After receiving the start input, the computing device may receive a shape from a touchsurface such as in the form of X and Y coordinates versus time, block 31. The computing device may receive the shape input for a preset amount of time, such as two seconds, after which the inputted shape information is processed. Alternatively, a user may press a key or otherwise indicate that the shape entry is completed (not shown in FIG. 3). Once the shape has been entered, the computing device may process the entered shape to determine the shape defining parameters, block 32. As discussed above, the processing and shape parameters will depend upon the method used to define and store the shape in memory. In one implementation, the shape may be abstracted as a sequence of X and Y touchscreen dimensions corresponding to sampling times, an example of which is illustrated in FIG. 8. In another implementation, the shape may be abstracted into a series of vectors (such as in the form of angle and length data pairs). The computing device may then determine whether sufficient shape inputs have been entered to enable statistical analysis of the shape's variability, decision block 33. If more shape inputs are required (i.e., decision block 33="No"), the computing device may prompt the user to enter the shape again, block 34. Once sufficient shapes have been entered (i.e., decision block 33="Yes"), the computing device can apply statistical algorithms to determine the statistical bounds of the shape parameters, block 35. As discussed above, this statistical analysis may define an envelope within which an entered shape corresponds to a stored code shape. Alternatively, this statistical analysis may define a shape correlation threshold which, if satisfied, indicates that the entered shape falls within the variability of the shapes entered by the user during training. Finally, the shape parameters along with the boundary values or correlation threshold may be stored in memory, block 36.

Figure 4:
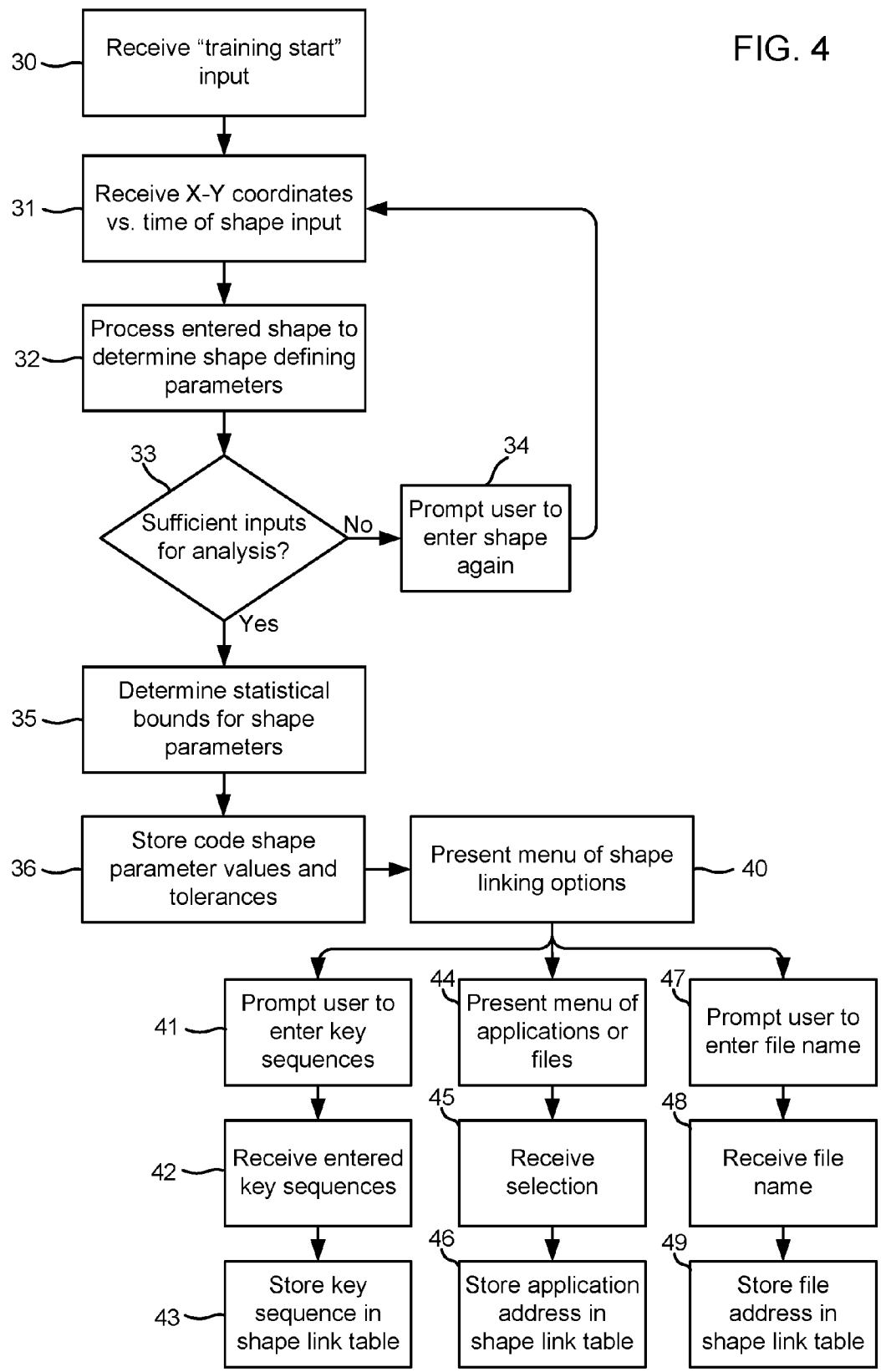
FIG. 4 is a process flow diagram of a method for generating a code shape and linking it to a desired action.

At the time a code shape is defined, it may be linked to a particular application, file, function or sequence of keystrokes as illustrated in FIG. 4. In some implementations, multiple methods may be provided for linking functions to a code shape, while in other implementations only a single function linking method may be provided. In the example implementation illustrated in FIG. 4, three different methods are offered to a user for linking a code shape to a desired action. In the method illustrated in FIG. 4, once the code shape is defined by executing the process illustrated in blocks 30 through 36 (as described above with reference to FIG. 3), the computing device may present a menu of the various options by which the user may link it to a particular application, file, function or sequence of keystrokes, block 40. Such a menu will enable a user to select whether a desired action is entered as a sequence of key strokes/menu selections, blocks 41-43, is selected from a menu of applications, functions or files, blocks 44-46, or is entered as a file name, blocks 47-49, such as the name of an image or text file or a bit application.

If a user selects an option of entering a sequence of keystrokes or menu selections, the computing device may then prompt the user to begin entering the keystrokes or menu selections, block 41. Thereafter, the computing device receives and records the keystrokes or menu selections entered by a user, block 42. The entry keystrokes or menu selections may continue until the computing device receives a signal that the keystroke entry is complete, such as the user stops entering keystrokes or a particular sequence ending key is pressed. Once the keystrokes and menu selections have been entered, the recorded sequence may be stored in a data table linked to the particular code shape, block 43. In this manner, a user can configure the computing device to perform a sequence of steps or activate one or more applications by replicating the sequence of keystrokes and menu selections entered during block 42. Thus, this programming process provides flexibility to the user to link code shapes to a wide variety of actions. For example, a user may configure a code shape in a cellular telephone to send a certain text message to a particular cellular telephone number by selecting the SMS application in a sequence of menu selections, typing in the desired text message and a sequence of key presses, entering the destination telephone number and a sequence of key presses, and selecting a send menu option before terminating the key sequence entry process. Thereafter, whenever the corresponding code shape is entered into the cellular telephone's touchscreen, the cellular telephone will implement the stored sequence of menu selections and key presses which will result in the desired text message being sent to the destination telephone number.

If a user selects an option of selecting a file or application to link to a code shape using a menu, the computing device may present a menu of applications or files to the user, block 44. This menu may be any of the menu or user interface displays available on the computing device, such as a list of files and applications or a graphical user interface of file and application icons. The computing device may then receive a user selection, block 45, recognizing the selection of a file or application as the object to be linked to the particular code shape. The filename or a link to the selected file or application can then be stored in a data table linked to the particular code shape, block 46. Thereafter, whenever the corresponding code shape is entered into the computing devices touchsurface, the computing device will implement the linked file or activate the linked application. For example, if the linked file is a graphic file, the computing device may display the graphic which may also include starting a graphics application if required. As another example, if the code shape is linked to a calculator application, recognition of the code shape will cause the calculator application to be launched.

If the user selects an option of entering a name to be linked to a code shape, the computing device may prompt the user to enter the desired file or application name, block 47. The computing device receives the entered file name, block 48, and stores it in a data table linked to the particular code shape, block 49. Thereafter, whenever the corresponding code shape is entered into the computing devices touchsurface, the computing device will implement the linked file name.

While FIG. 4 shows the process of selecting a particular application, file, function or sequence of keystrokes to be linked to a code shape after that shape has been defined, the process sequence may be reversed. In this implementation, the computing device may prompt a user to identify a desired action, by implementing blocks 40 through 49, before prompting the user to enter the desired corresponding code shape, by implementing blocks 30 through 36. In an implementation, the user may be given the choice of identifying the application, file, function or sequence of keystrokes before or after training the computing device to recognize a particular code shape.

Figure 5:
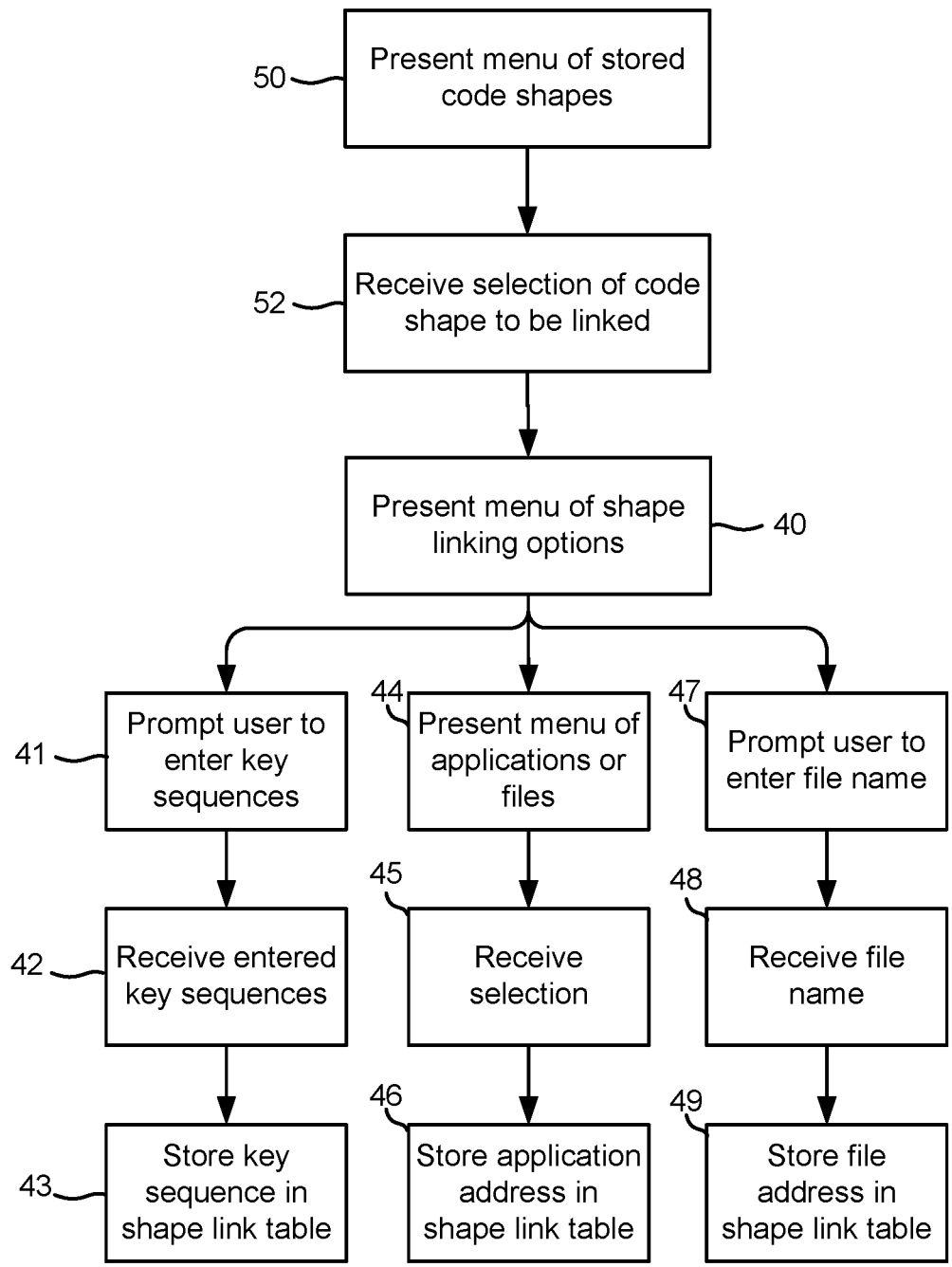
FIG. 5 is a process flow diagram of a method for linking a code shape to a desired action.

Code shapes stored in memory can later be linked to a particular application, file, function or sequence of keystrokes as illustrated in FIG. 5. Similarly, the application, file, function or sequence of keystrokes linked to a particular code shape can be changed so that a user can change the actions that will be implemented for a particular code shape without having to create new code shapes. This may be accomplished using a menu sequence, such as by presenting a menu of these stored code shapes, block 50. This menu may display the shapes on the screen or display a list of the shapes if the user has entered a name that is associated with each code shape. A user can then peruse the menu until the desired code shape is identified. The computing device may receive the user's selection of the code shape to be linked to an action, block 52. At this point, the computing device may implement the process described above with reference to blocks 40 to 49 illustrated in FIG. 4 to receive the actions to be linked to the current shape.

Figure 6:
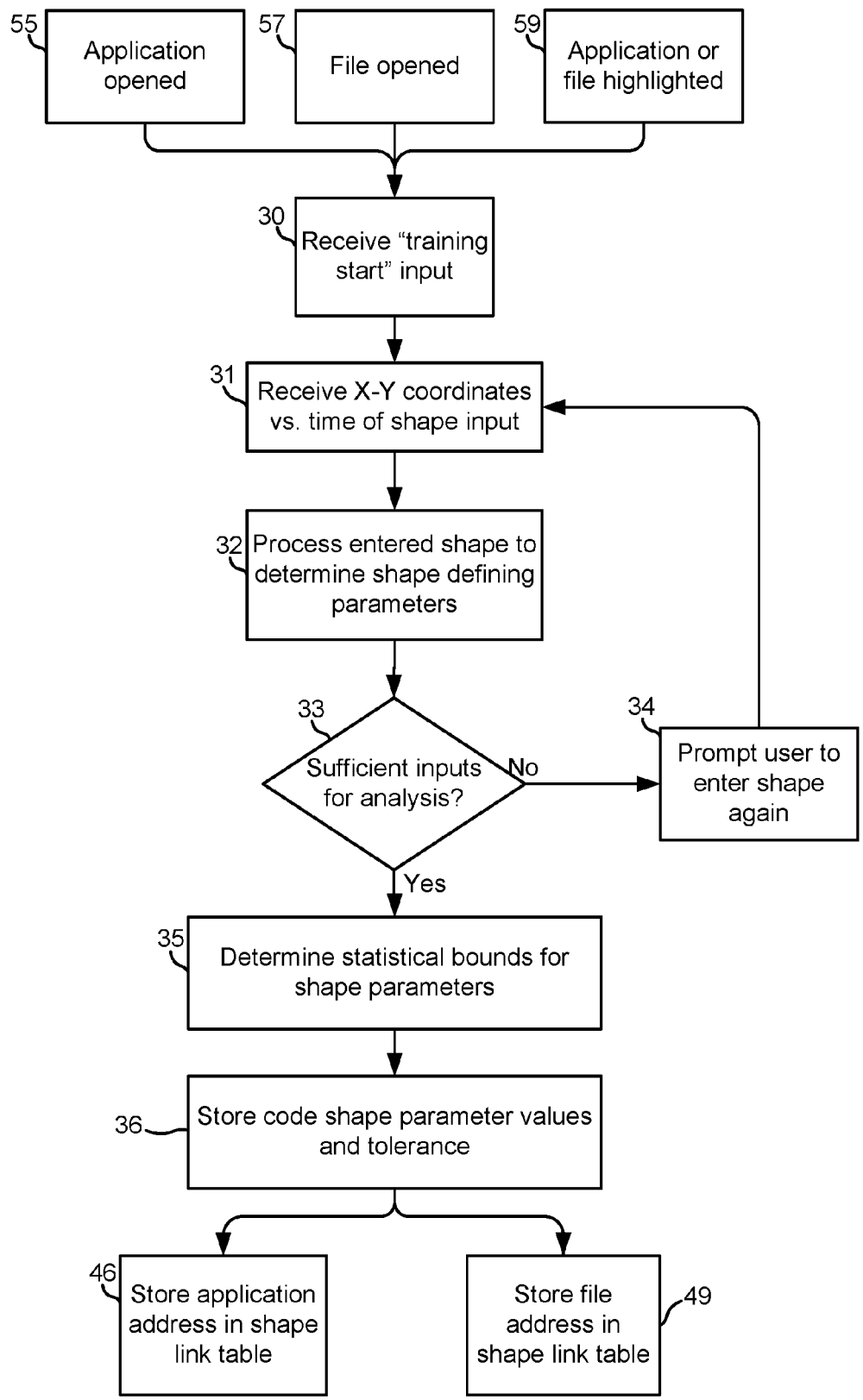
FIG. 6 is a process flow diagram of an alternative method for linking a code shape to a desired action.

In yet another implementation, an opened application or file can be linked to a new code shape as illustrated in FIG. 6. This operation enables users to create a code shape for the open application of file in a manner similar to a "save as" file naming operation. This process may be accomplished using many of the operations described above with reference to FIGS. 3 and 4, so the descriptions of like numbered blocks are incorporated here by reference. While a particular application is open, block 55, a user can initiate the code shape training operation by entering a code shape training request command, such as by selecting a menu function or press a key or sequence of keys, to inform the computing device that a shape is about to be entered for training purposes, block 30. For example, if a user has a calculator application open and would like to create a code shape for that application, the user simply initiates code shape training via a pressing a key or a sequence of keys. This initiates the code shape training operations, blocks 31-36, which are implemented as described above with reference to FIGS. 3 and 4. Once the code shape has been created and stored in memory, the currently active application is linked to the code shape by storing the application memory address in the shape link table, block 46.

In a similar manner, a user can create a new code shape for an open or highlighted file (e.g., a *.pdf, *.html, *.doc, or other type file). While a file is open, block 57, a user can initiate the code shape training operation by selecting a menu function or press a key or sequence of keys to inform the computing device that a shape is about to be entered for training purposes, block 30. For example, if a user has just created a text document and would like to create a code shape for use in recalling the document, the user simply initiates code shape training via a pressing a key or a sequence of keys. This initiates the code shape training operations, blocks 31-36, which are implemented as described above with reference to FIGS. 3 and 4. Once the code shape has been created and stored in memory, the open file is linked to the code shape by storing the file's memory address in the shape link table, block 49.

A similar process may be used to create a code shape for an application or a file stored in memory without requiring the application or file to be opened. In this alternative, a user may highlight the application or file, such as by selecting it in a menu or file list within a graphical user interface, block 59, and then initiating the code shape training operation by selecting a menu function or press a key or sequence of keys to inform the computing device that a shape is about to be entered for training purposes, block 30. Once the code shape training operations, blocks 31-36, are completed, the highlighted application or file is linked to the code shape by storing the file's memory address in the shape link table, block 46 or 49.

Figure 7:
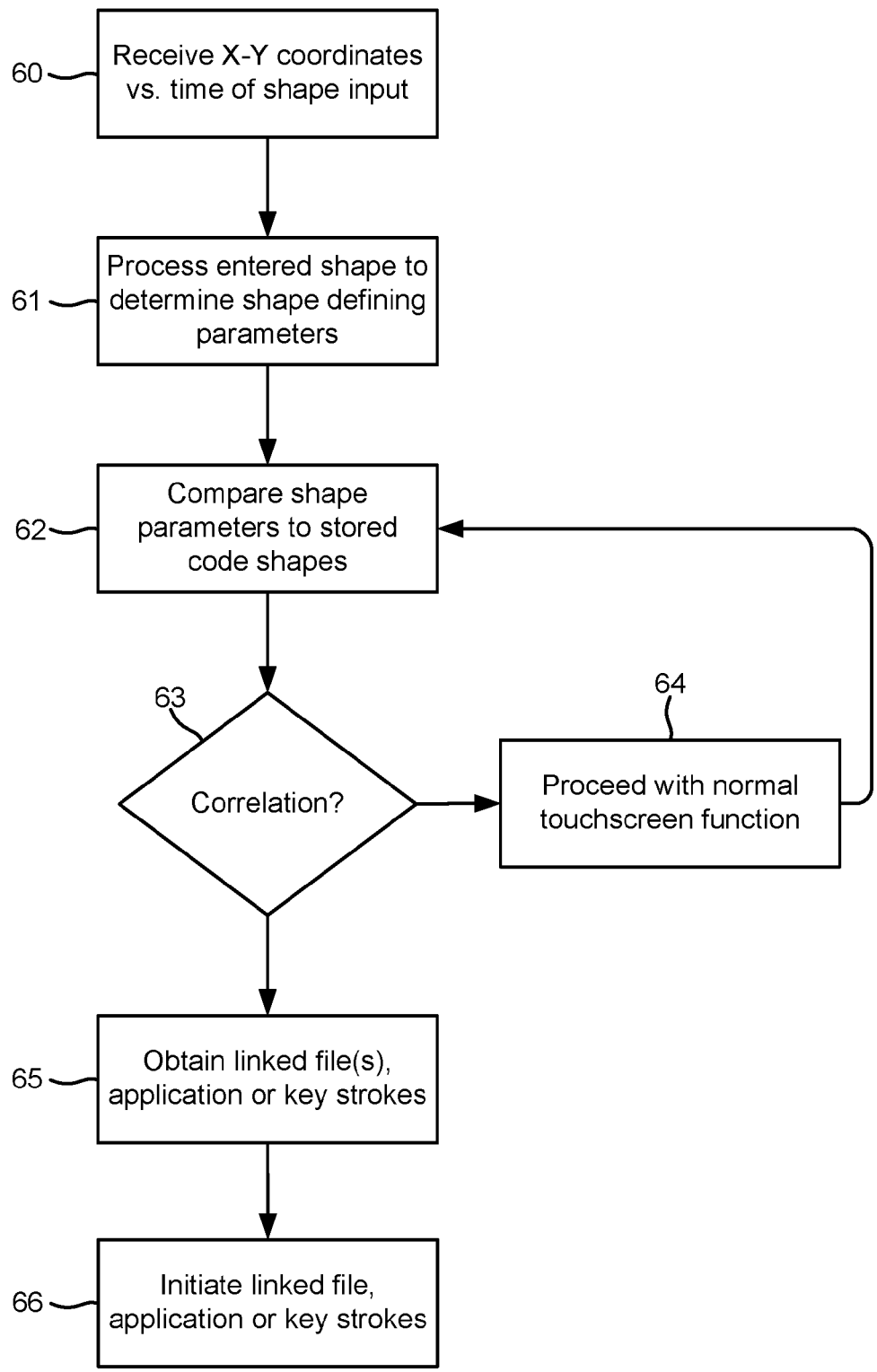
FIG. 7 is a process flow diagram of a method for receiving a shape and implementing a desired action if it correlates to a code shape.

Once a code shape and its corresponding action has been defined and stored in memory, a user can implement that action simply by drawing the code shape on the computing device's touchsurface. This process is illustrated in FIG. 7. At any time, the computing device may receive position information (e.g., X and Y coordinates) from a touchsurface, block 60. Such position information may be received as a function of time as the computing device may query the touchsurface or receive interrupts from the touchsurface on a regular interval, such as once every couple microseconds. This shape input may be processed to determine the shape defining parameters, block 61. As discussed above with reference to FIG. 3, the processing algorithm used to analyze the entered shape will depend upon the type of parameters used to define shapes and store code shapes in memory. With the shape parameters determine, those values can be used to compare the entered shape to code shapes stored in memory, block 62. A variety of graphical and statistical methods can be used to compare an entered shape to code shapes stored in memory. For example, a statistical comparison can be made of the various entered X and Y values to data sets of stored code shapes to determine the degree to which there is a statistical correlation. As another example, the sequence of primitives recognized within the entered shape may be compared to the sequence of primitives stored in memory for each code shape to determine if there is a match or statistical correlation. A variety of known feature recognition algorithms may be implemented to accomplish this process. This process may make use of known image recognition methods, as well as graphic feature and character recognition methods, such as those used in handwriting recognition algorithms. Examples of feature recognition methods that may be implemented are disclosed in: C. Li and K. Hui, *A Template—matching Approach to Free form Feature Recognition*, Information Visualization IV'2000, IEEE; S. Agarwal and V. Kumar, Online Character Recognition, Proceedings of the Third International Conference on Information Technology and Applications (ICITA '05), IEEE; and M. Pastor, et. al, *Writing Speed Normalization for On-Line Handwritten Text Recognition*, Proceedings of the 2005 Eight International Conference on Document Analysis and Recognition (ICDAR '05), IEEE, each of which is hereby incorporated by reference in their entirety.

The comparison of the entered shape to the saved code shapes may be performed as a table look up, by comparing the enter shape parameters to each of the saved code shape parameters in a code shape table. In this comparison, the computing device may determine whether the entered shape parameters exhibits a statistically significant correlation to any one of the stored code shapes, decision block 63. In this process, the correlation between the entered shape parameters and each stored code shape may be compared to a correlation threshold for the code shape that was determined when the code shape was trained (see FIG. 3). Alternatively, the correlation evaluation process may determine whether the entered shape parameters fall within the envelope for each stored code shape that was determined when the code shape was trained. If the entered shape does not correlate with any of the stored code shapes (i.e., decision block 63="No"), then the input from the touchsurface may be processed as a normal touchsurface user input, block 64.

If the entered shape correlates to a stored code shape (i.e., decision block 63="Yes"), the application, file, function or sequence of keystrokes that is linked to that code shape are obtained from memory, block 65, and activated or initiated, block 66.

As described above, the shape parameters used to characterize an entered shape and stored code shapes may be stored in a variety of formats and parameterization schema. For example, a shape may be characterized by a sequence of X and Y touchscreen coordinates as a function of sampling time. Such shape parameters may be stored in a data structure such as the example data table illustrated in FIG. 8. In this example data table, a shape is defined by the X and Y touchscreen coordinates sampled every 10 milliseconds. This data may be stored in a data table as a series of data records 70a-70v that each contains data fields storing the sampling time 72, as well as the X-axis coordinate 72 and the Y-axis coordinate 76 of any sensed touch.

FIG. 8 also illustrates that additional shape parameters related to a code shape may also be included in the code shape data table. For example, the code shape parameters may include the speed of the finger or stylus drawing across the touchsurface at each sampling time. Other parameters that may be used to characterize a shape include pressure and line width. By including more shape characteristics in the code shape parameters the unique pattern of a user's code shape can be captured, thereby personalizing the code shape data to a particular user. Thus, an imposter drawing the same shape on a touchscreen may not have the entered shape recognized as a code shape.

FIG. 9 illustrates another example data structure for storing code shape parameters along with linked applications, files, functions or key strokes. In this example, a single data table is used to store the code shapes in a number of data records 80a-80d, with each data record comprised of data fields including an index 82, the shape parameters 84, an indication of the type of linked actions 86, and the linked applications, files, functions or key strokes 88. This example includes an optional data field for indicating the type of linked actions 86 to simplify implementation of the action stored in a data field 88. For example, data record 80a indicates that the stored action is an application and that the linked application is a calculator program. As another example, data record 80b indicates that the stored action is a text string and the linked action data field 88 contains the text string "Hi there." As another example, data record 80c indicates that the type of linked action is a file and the linked action data field 88 contains the name of that file "Mom.tiff." In yet another example, data record 80d indicates that the type of linked action includes keystrokes and the linked action data field 88 stores a sequence of keystrokes that will dial a telephone number "818-555-1212."

FIG. 9 also illustrates different ways that shape parameters may be stored within a code shape parameter data field. As illustrated in data records 80a and 80b, a shape may be stored as a series of vector descriptors. For example, data record 80a stores a plus sign ("+") shape as two vectors, the first of which extends from a starting position X, Y and terminates at an ending position X+20, Y, and the second of which extends from the starting position X+10, Y+10 and terminates at the ending position X+10, Y−10. In this example, the values X and Y are arbitrary starting points with the other points on the shape defined as relative values with respect to the starting points. By using relative position values instead of absolute touchsurface coordinates, a computing device can recognize a correlation even if the shape is started and ended in a slightly different position on the touchsurface. Data record 80b illustrates another form of a vector shorthand representation of a shape, in this case a line extending from the upper left corner to the lower right corner.

As an alternative to storing the shape parameters directly in the code shape linked action data structure (as illustrated in data records 80a and 80b), the shape parameters may be stored in a separate data structure, such as a data table like that illustrated in FIG. 8, with a memory pointer or address for that separate data table stored in the shape parameter data field 84. For example, as indicated in data record 80*c* a pointer to an XY coordinate data table (such as illustrated in FIG. 8) may be provided in the shape parameter data field 84. During a comparison process, the computing device may use the memory address or pointer stored in the shape parameter data field 84 to locate the data file storing a particular code shape, and then use that address to open the file in order to conduct the comparison. By including a link to a shape parameter data table instead of including the shape parameters within the code shape linked action data structure, code shapes may be stored using different kinds of shape characterization methods. For example, data record 80*c* includes an entry in the shape parameter data field 84 linking to an X-Y coordinate data table while data record 80*d* includes an entry in the shape parameter data field 84 linking to a vector parameter file. In this example, the index data field 82 is optional but may be useful for operations such as linking actions to particular code shapes.

FIG. 10 illustrates another alternative data structure that may be implemented in an aspect of the present invention. In this data structure, the code shape parameters are stored in a first data table 90 while the linked applications, files, functions or key strokes are stored in a second data file 91 that is cross-correlated to the first data table 90 by use of a common index number stored in data field 92. Thus, in this example data structure the code shape parameter values are stored in a series of data records 93*a*-93*b* which include an index data field 92 and the shape parameter data in a shape parameter field 94. Any number of data fields may be included in this data table 90 in order to fully characterize a code shape. Thus more than one shape parameter data field 94 may be included, which can be used to accommodate complex shapes. Cross correlating the code shape parameter data table 90 with a data table 91 for indicating linked applications, files, functions or key strokes may simplify the data structure, as well as simplifying the processes of linking and updating desired actions to stored code shapes.

The data structures used to store code shapes and linked actions may be stored on a tangible media, such as memory chips (e.g., the SIM card and similar memory cards used in cellular telephones), or transmitted via a data link, such as a wired or wireless data link. In this manner, the data structures may be backed up and transferred to other computing devices. Also users may create a set of code shapes that can be reused in other computing devices simply by copying them from the storage media or transmitting them from one device to another. In this matter, users can implement a single set of code shapes along with their corresponding actions in multiple computing devices.

Figure 11:
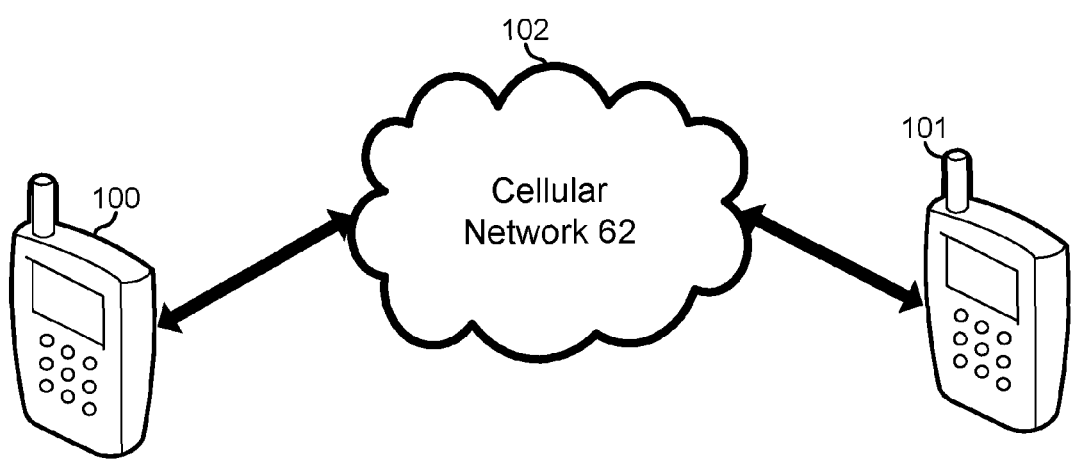
FIG. 11 is a communication network diagram illustrating communications according to an aspect of the present invention.

The portability of code shape data structures also enables a new form of communication. In this method of communication, a user can share a shape data table with a second computing device, such as by copying the data table to a from a tangible storage medium (e.g., a memory chip) or by transmitting the data table via a data link. Thereafter, the user can communicate with the second computing device by communicating shape parameter values instead of an otherwise interpretable data string. This is illustrated in FIG. 11 which shows a first computing device 100 communicating with a second computing device 101 via a cellular telephone network 102. Rather than communicating data or voice data, this communication transmits only the shape parameter values from a shape drawn on the touchscreen of the first computing device 100. For example, a user can communicate with another by drawing a shape on the touchscreen of his/her cellular telephone that is configured to send the shape parameters to another cellular telephone on which is stored the user's code shape data table. Only the shape parameters are transmitted so the transmission cannot be understood if intercepted. Upon reception, and the shape parameters are compared to the shape data table to determine if there is a correlation, and if there is, the corresponding application, function, file or keystroke sequence is implemented on the receiving device. In this manner, a user can quickly and securely send a message which causes an action to occur on the receiving device. For example, a user may draw a smiley face on his/her cellular telephone touchscreen. When the shape parameters are transmitted to the receiver cellular telephone that telephone will implement the actions stored in the code shape table to display a thoughtful message or a particular picture on the screen. Thus, this capability enables users to securely communicate highly personalized messages among computing devices simply by drawing shapes on a touchsurface.

Figure 12:
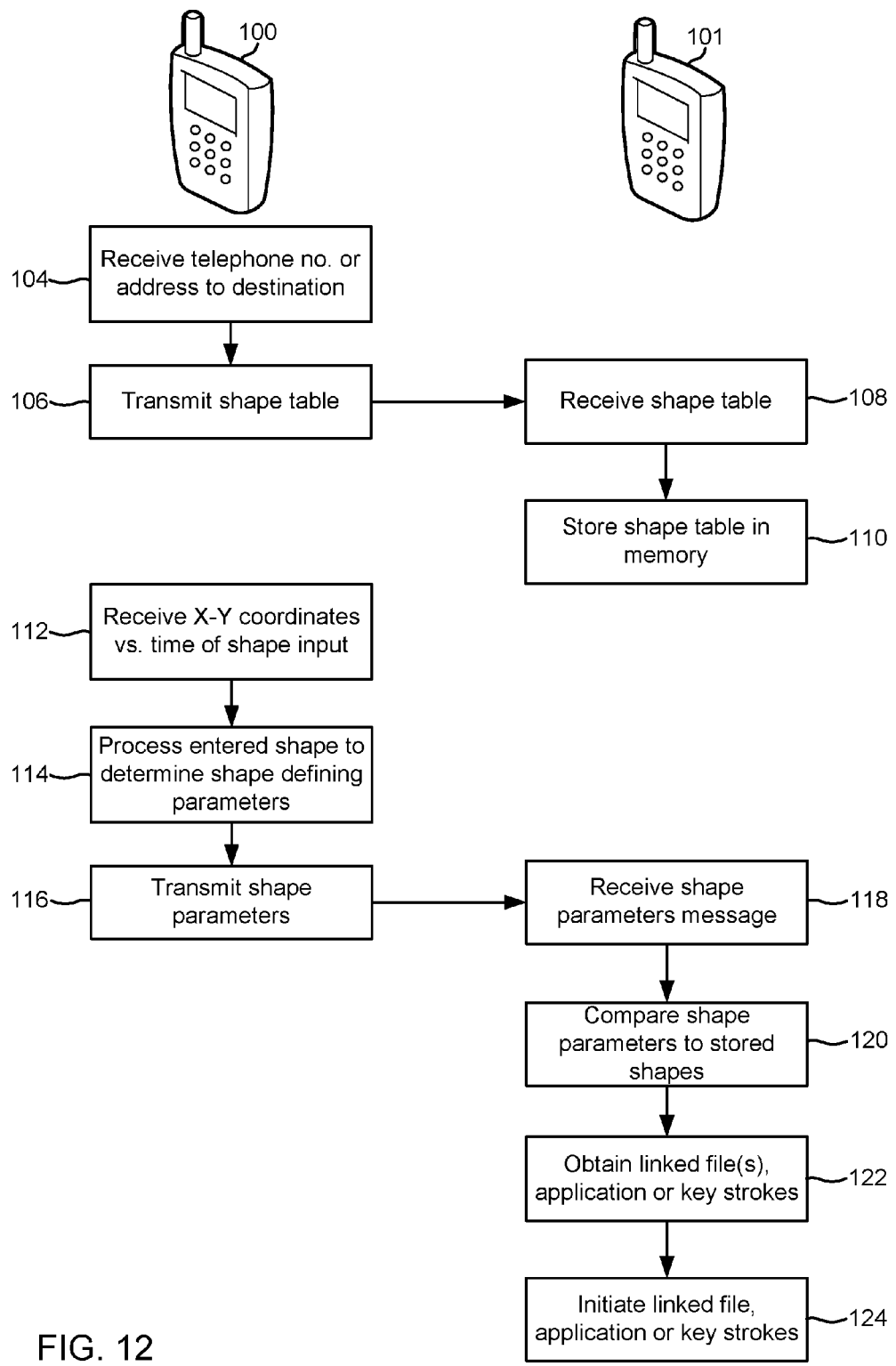
FIG. 12 is a process flow diagram for communicating between to communication devices using shape parameters.

The process for communicating by transmitting shape parameters is illustrated in FIG. 12. In order to begin such communications, the user's shaped table needs to be transmitted to a recipient's computing device 101. This may be accomplished, for example, by a user entering the telephone number or address for the destination computing device, block 104. Using this entered information, the first computing device 100 may transmit the code shape data table to the destination computing device, block 106. The receiving computing device 101 receives the code shape table, block 108, and stores that table in memory, block 110. At this point, the first computing device 100 can prompt an action to take place on the second computing device 101 by sending shape parameter data.

A user can send a message by drawing a shape on the user's computing device 100. As that shape is drawn, the computing device 100 receives the X and Y coordinates versus time of the shape input, block 112. The communication device processes the entered shape to determine the shape defining parameters, block 114. This processing may take place in a manner very similar to that described above with reference to FIG. 3. Those shape defining parameters may then be transmitted via a telecommunication link from the first computing device 100 to the second computing device 101, block 116. Shape parameters may be transmitted in a variety of different message structures, such as within the body of an SMS message, within the body of an e-mail message, or as a data string transmitted using any form of data link. Shape parameters may also be communicated by other data links, such as Bluetooth, infrared data link, WiFi, Zigbee, and other data link protocols that may be developed. The second computing device 101 receives the shape parameters message, block 118, and compares the received shape parameters to the stored code shapes within the code shape parameter table, block 120. If there is a correlation between the received shape parameters and the code shape stored in memory then the linked application, function, file or key strokes associated with that matched correlated code shape are obtained from the code shape data table, block 122. The obtained application, function, file or keystroke sequence is then initiated on the receiving device 101, block 124.

Figure 13:
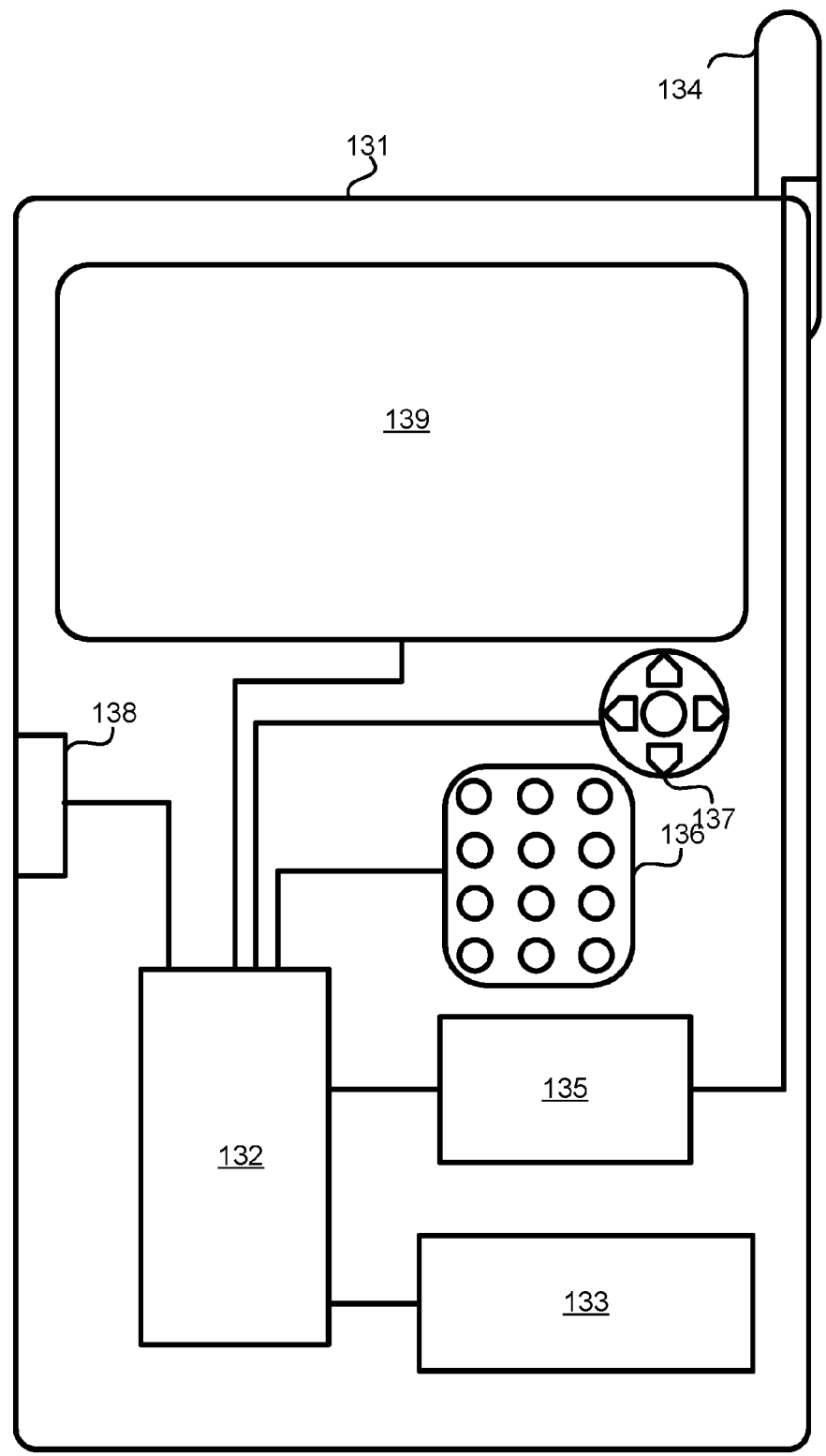
FIG. 13 is a component block diagram of an example portable computing device suitable for use with the various aspects of the present invention.

The aspects described above may be implemented on any of a variety of mobile devices. Typically, such mobile devices will have in common the components illustrated in FIG. 13. For example, the portable computing devices 131 may include a processor 132 coupled to internal memory 133 and a touchscreen display 139. The touchscreen display 139 can be any type of touchscreen, such as a resistive-sensing touchscreen, capacitive-sensing touchscreen, infrared sensing touchscreen, acoustic/piezoelectric sensing touchscreen or the like. The various aspects are not limited to any particular type of touchscreen or touchpad technology. Additionally, the portable computing device 131 will have an antenna 134 for sending and receiving electromagnetic radiation that is connected to a wireless data link and/or cellular telephone transceiver 135 coupled to the processor 132. In some implementations, the transceiver 135 and portions of the processor 132 and memory 133 used for cellular telephone communications is referred to as the air interface since it provides a data interface via a wireless data link. Portable computing devices 139 also typically include a key pad 136 or miniature keyboard and menu selection buttons or rocker switches 137 which serve as pointing devices for receiving user inputs for positioning a cursor within the display 139. The processor 132 may further be connected to a wired network interface 138, such as a universal serial bus (USB) or FireWire® connector socket, for connecting the processor 132 to an external pointing device (e.g., a mouse) or computing device such as a personal computer 160 or external local area network.

In some implementations, a touchsurface can be provided in areas of the electronic device 131 outside of the touchscreen 139. For example, the keypad 136 can include a touchsurface with buried capacitive touch sensors. In other implementations, the keypad 136 may be eliminated so the touchscreen 139 provides the complete user interface. In yet further implementations, the touchsurface may be an external touchpad that can be connected to the electronic device on 131 by means of a cable to a cable connector 138 a wireless transceiver (e.g., transceiver 135) coupled to the processor 132.

The processor 132 may be any programmable microprocessor, microcomputer or multiple processor chip or chips that can be configured by software instructions (applications) to perform a variety of functions, including the functions of the various aspects described above. In some portable computing device 131, multiple processors 132 may be provided, such as one processor dedicated to wireless communication functions and one processor dedicated to running other applications. The processor may also be included as part of a communication chipset. Typically, software applications may be stored in the internal memory 133 before they are accessed and loaded into the processor 132. In some mobile devices 131, the processor 132 may include internal memory sufficient to store the application software instructions. For the purposes of this description, the term memory refers to all memory accessible by the processor 132, including internal memory 133 and memory within the processor 132 itself. Application data files are typically stored in the memory 133. In many mobile devices 131, the memory 133 may be a volatile or nonvolatile memory, such as flash memory, or a mixture of both.

Figure 14:
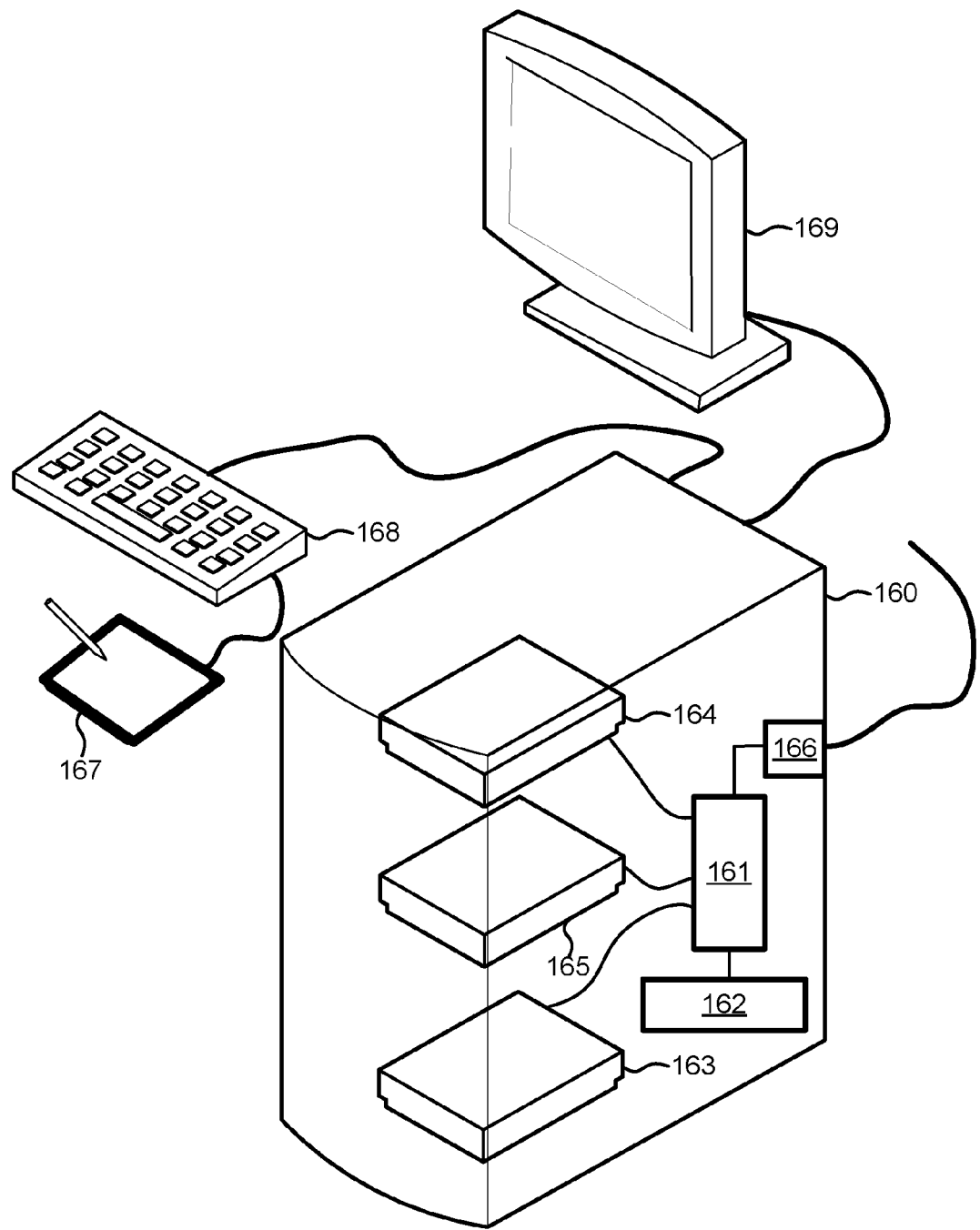
FIG. 14 is a component block diagram of a computer suitable for use with the various aspects of the present invention.

The aspects described above may also be implemented on any of a variety of computing devices, such as a personal computer 160 illustrated in FIG. 14. Such a personal computer 160 typically includes a processor 161 coupled to volatile memory 162 and a large capacity nonvolatile memory, such as a disk drive 163. The computer 160 may also include a floppy disc drive 164 and a compact disc (CD) drive 165 coupled to the processor 161. Typically the computer device 160 will also include a touchsurface pointing device such as a touchpad 167, a user input device such as a keyboard 168 and a display 169. The computer device 160 may also include a number of connector ports coupled to the processor 161 for establishing data connections or receiving external memory devices, such as a USB or FireWire® connector sockets or other network connection circuits 166 for coupling the processor 161 to a network. In a notebook configuration, the computer housing includes the touchpad 167, keyboard 168 and the display 169 as is well known in the computer arts.

The various aspects of the invention provide users with a quick and intuitive method to launch a specific application, dial a number or send a message by inputting a pictorial key, symbol or shape on a touchscreen, touchpad or other touchsurface.

The various aspects may be implemented by a computer processor 132, 161 executing software instructions configured to implement one or more of the described methods. Such software instructions may be stored in memory 162, 163 as separate applications, or as compiled software implementing an aspect method. Reference database may be stored within internal memory 133, 162, in hard disc memory 164, on tangible storage medium or on servers accessible via a network (not shown). Further, the software instructions and databases may be stored on any form of tangible processor-readable memory, including: a random access memory 133, 162, hard disc memory 163, a floppy disk (readable in a floppy disc drive 164), a compact disc (readable in a CD drive 165), electrically erasable/programmable read only memory (EEPROM), read only memory (such as FLASH memory), and/or a memory module (not shown) plugged into the computing device 131, 160, such as an external memory chip or a USB-connectable external memory (e.g., a "flash drive") plugged into a USB network port 166.

Those of skill in the art would appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a method described above and shown in the figures is for example purposes only as the order of some blocks may be changed from that described herein without departing from the spirit and scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein, and instead the claims should be accorded the widest scope consistent with the principles and novel features disclosed herein.

What is claimed is:

1. A method for initiating actions on a computing device, comprising:
   receiving on a touchsurface a series of movements and touches as a received shape;
   comparing the received shape to a code shape stored in memory,
      wherein the stored code shape comprises one or more parameters defining a nominal shape representative of one or more received shapes, each of the one or more received shapes comprising a series of one or more movements and touches defining that received shape, and a variability of the one or more received shapes about the nominal shape, and
      wherein comparing the received shape to the code shape stored in the memory comprises determining whether the received shape correlates to the nominal shape within the variability; and
   implementing an action linked to the stored code shape when the received shape correlates to the code shape, wherein the code shape stored in the memory is linked to at least one action.

2. The method of claim 1, wherein the touchsurface is one of a touchscreen and a touchpad.

3. The method of claim 1, further comprising processing the received shape as a touchsurface user interface command when the received shape does not correlate to the code shape.

4. The method of claim 1, further comprising linking the action to the stored code shape.

5. The method of claim 4, wherein linking the action to the stored code shape comprises:
   receiving a sequence of keystrokes; and
   storing the received sequence of keystrokes in the memory correlated to the code shape.

6. The method of claim 4, wherein linking the action to the stored code shape comprises:
   receiving identification of an application; and
   storing a link to the identified application in the memory correlated to the code shape.

7. The method of claim 4, wherein linking the action to the stored code shape comprises:
   receiving a code shape training request command while a file or application is open; and
   linking an address for the open file or application to the stored code shape.

8. The method of claim 4, wherein linking the action to the stored code shape comprises:
   receiving a code shape training request command while a file or application is highlighted in a graphical user interface; and
   linking an address for the highlighted file or application to the stored code shape.

9. A method for storing code shapes on a computing device, comprising:
   receiving on a touchsurface one or more times a series of movements and touches defining one or more received shapes;
   determining parameters defining a nominal shape representative of the one or more received shapes;
   determining a variability of the one or more received shapes about the nominal shape;
   storing the nominal shape defining parameters and the determined variability in memory as a code shape; and
   linking an action to the stored code shape.

10. The method of claim 9, wherein linking the action to the stored code shape comprises:
    receiving a sequence of keystrokes; and
    storing the received sequence of keystrokes in the memory correlated to the code shape.

11. The method of claim 9, wherein linking the action to the stored code shape comprises:
    receiving identification of an application; and
    storing a link to the identified application in the memory correlated to the code shape.

12. The method of claim 9, wherein linking the action to the stored code shape comprises:
    receiving a code shape training request command while a file or application is open; and
    linking an address for the open file or application to the stored code shape.

13. The method of claim 9, wherein linking the action to the stored code shape comprises:
    receiving a code shape training request command while a file or application is highlighted in a graphical user interface; and
    linking an address for the highlighted file or application to the stored code shape.

14. The method of claim 9, wherein the touchsurface is one of touchscreen and a touchpad.

15. A computing device, comprising:
    a processor;
    a touchsurface coupled to the processor; and
    a memory coupled to the processor;
    wherein the processor is configured to perform operations comprising:
       receiving on the touchsurface a series of movements and touches as a received shape;
       comparing the received shape to a code shape stored in the memory,
          wherein the stored code shape comprises one or more parameters defining a nominal shape representative of one or more received shapes, each of the one or more received shapes comprising a series of one or more movements and touches defining that received shape, and a variability of the one or more received shapes about the nominal shape, and
          wherein comparing the received shape to the code shape stored in the memory comprises determining whether the received shape correlates to the nominal shape within the variability; and
       implementing an action linked to the stored code shape when the received shape correlates to the code shape, wherein the code shape stored in the memory is linked to at least one action.

16. The computing device of claim 15, wherein the touchsurface is one of touchscreen and a touchpad.

17. The computing device of claim 15, wherein the processor is configured to perform operations further comprising processing the received shape as a touchsurface user interface command when the received shape does not correlate to the code shape.

18. The computing device of claim 15, wherein the processor is configured to perform operations further comprising linking the action to the stored code shape.

19. The computing device of claim 18, wherein the processor is configured to perform operations such that linking the action to the stored code shape comprises:
receiving a sequence of keystrokes; and
storing the received sequence of keystrokes in the memory correlated to the code shape.

20. The computing device of claim 18, wherein the processor is configured to perform operations such that linking the action to the stored code shape comprises:
receiving identification of an application; and
storing a link to the identified application in the memory correlated to the code shape.

21. The computing device of claim 18, wherein the processor is configured to perform operations such that linking the action to the stored code shape comprises:
receiving a code shape training request command while a file or application is open; and
linking an address for the open file or application to the stored code shape.

22. The computing device of claim 18, wherein the processor is configured to perform operations such that linking the action to the stored code shape comprises:
receiving a code shape training request command while a file or application is highlighted in a graphical user interface; and
linking an address for the highlighted file or application to the stored code shape.

23. A computing device, comprising:
a processor;
a touchsurface coupled to the processor; and
a memory coupled to the processor;
wherein the processor is configured to perform operations comprising:
receiving on the touchsurface one or more times a series of movements and touches defining one or more received shapes;
determining parameters defining a nominal shape representative of the one or more received shapes;
determining a variability of the one or more received shapes about the nominal shape;
storing the nominal shape defining parameters and the determined variability in the memory as a code shape; and
linking an action to the stored code shape.

24. The computing device of claim 23, wherein the processor is configured to perform operations such that linking the action to the stored code shape comprises:
receiving a sequence of keystrokes; and
storing the received sequence of keystrokes in the memory correlated to the code shape.

25. The computing device of claim 23, wherein the processor is configured to perform operations such that linking the action to the stored code shape comprises:
receiving identification of an application; and
storing a link to the identified application in the memory correlated to the code shape.

26. The computing device of claim 23, wherein the processor is configured to perform operations such that linking the action to the stored code shape comprises:
receiving a code shape training request command while a file or application is open; and
linking an address for the open file or application to the stored code shape.

27. The computing device of claim 23, wherein the processor is configured to perform operations such that linking the action to the stored code shape comprises:
receiving a code shape training request command while a file or application is highlighted in a graphical user interface; and
linking an address for the highlighted file or application to the stored code shape.

28. The computing device of claim 23, wherein the touchsurface is one of touchscreen and a touchpad.

* * * * *